US008188828B2

(12) United States Patent
Noma et al.

(10) Patent No.: US 8,188,828 B2
(45) Date of Patent: May 29, 2012

(54) MULTILAYER ELECTRONIC COMPONENT AND ELECTRONIC COMPONENT MODULE INCLUDING THE SAME

(75) Inventors: Takashi Noma, Moriyama (JP); Jun Sasaki, Kyoto (JP); Kosuke Yamada, Nagaokakyo (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 12/486,477

(22) Filed: Jun. 17, 2009

(65) Prior Publication Data

US 2009/0256668 A1 Oct. 15, 2009

Related U.S. Application Data (63) Continuation of application No. PCT/JP2008/073203, filed on Dec. 19, 2008.

(30) Foreign Application Priority Data

Dec. 26, 2007 (JP) .................................. 2007-335086

(51) Int. Cl.
*H01F 5/00* (2006.01)
*H01F 27/30* (2006.01)
*H01F 27/28* (2006.01)

(52) U.S. Cl. ......... 336/200; 336/206; 336/223; 336/232
(58) Field of Classification Search .................. 336/200, 336/206, 223, 232
See application file for complete search history.

(56) References Cited

U.S. PATENT DOCUMENTS

| 6,218,925 B1* | 4/2001 | Iwao ............................. 336/200 |
| 6,403,199 B2* | 6/2002 | Mori et al. ..................... 428/209 |
| 6,498,553 B1* | 12/2002 | Tanaka et al. .................. 336/83 |
| 6,568,054 B1* | 5/2003 | Kumagai et al. ............. 29/25.42 |
| 6,710,694 B2* | 3/2004 | Matsuta et al. ............... 336/200 |
| 2004/0252596 A1* | 12/2004 | Cho et al. .................... 369/44.12 |

FOREIGN PATENT DOCUMENTS

| JP | H06-34216 U | 5/1994 |
| JP | 9-260144 A | 10/1997 |
| JP | 10-270249 A | 10/1998 |
| JP | H10-270249 A | 10/1998 |

(Continued)

OTHER PUBLICATIONS

Naoaki Shigeta; "Written Opinion of the International Search Authority", PCT/JP2008/073203; Mar. 10, 2009.
Notice of First Office Action from China State Intellectual Property Office dated Mar. 23, 2011; Chinese Patent Application No. 200880002496.9.

(Continued)

*Primary Examiner* — Elvin G Enad
*Assistant Examiner* — Ronald Hinson
(74) *Attorney, Agent, or Firm* — Studebaker & Brackett PC; Tim L. Brackett, Jr.; John F. Guay (57) ABSTRACT

A multilayer electronic component that can suppress the formation of projections and depressions on a surface, and an electronic component unit including the multilayer electronic component, are provided. In the multilayer electronic component, coil electrodes (8) having a shape of ring-shaped wiring with a part removed therefrom are electrically connected to each other to constitute a coil (L). Magnetic layers (4) are stacked together with the plurality of coil electrodes (8). The coil electrodes (8a, 8c, 8e) having a radius r1 and the coil electrodes (8b, 8d) having a radius r2 that is smaller than the radius r1 may be alternately arranged in a stacking direction.

20 Claims, 5 Drawing Sheets

FOREIGN PATENT DOCUMENTS

| | | |
|---|---|---|
| JP | 11-003829 A | 1/1999 |
| JP | 2001-257127 A | 9/2001 |
| JP | 2002-097072 A | 4/2002 |
| JP | 2002-151331 A | 5/2002 |
| JP | 2003-092214 A | 3/2003 |
| JP | 2006-339617 A | 12/2006 |
| JP | 2007-063060 A | 3/2007 |
| JP | 2007-317838 A | 12/2007 |

OTHER PUBLICATIONS

Japanese Office Action "Notice of Reason for Rejection" with mailing date of Jun. 21, 2011; Japanese Patent Application No. 2009-523892; with translation.

The Notice of Second Office Action from the State Intellectual Property Office of the People's Republic of China dated Feb. 2, 2012; Application No. 200880002496.9 with translation.

\* cited by examiner

FIG. 1

STACKING DIRECTION

Prior Art

MULTILAYER ELECTRONIC COMPONENT AND ELECTRONIC COMPONENT MODULE INCLUDING THE SAME

CROSS REFERENCE TO RELATED APPLICATIONS

The present application is a continuation of International Application No. PCT/JP2008/073203, filed Dec. 19, 2008, which claims priority to Japanese Patent Application No. JP2007-335086 filed Dec. 26, 2007, the entire contents of each of these applications being incorporated herein by reference in their entirety.

The present invention relates to a multilayer electronic component and an electronic component module including the multilayer electronic component, and in particular to a multilayer electronic component having a structure in which insulating layers and inner electrodes are stacked and an electronic component module including the multilayer electronic component.

BACKGROUND OF THE INVENTION

1. Field of the Invention

The present invention relates to a multilayer electronic component having a structure in which magnetic layers and coil electrodes are alternately stacked.

2. Description of Related Art

In general, a plurality of coil electrodes of such a multilayer electronic component are arranged so as to overlap each other when viewed in a stacking direction. An example of this conventional structure is shown in Japanese Unexamined Patent Application Publication No. 11-3829, hereinafter JP 11-3829. However, a multilayer coil component disclosed in JP 11-3829 has a problem in that projections and depressions are formed on the surface of a multilayer body, as described below with reference to FIG. 11, which is a sectional view of a conventional multilayer coil component.

Figure 11:
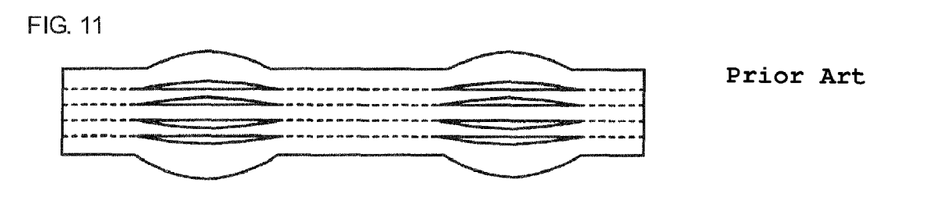
FIG. 11 is a sectional view of existing traditional multilayer coil component.

As shown in FIG. 11, since coil electrodes are arranged in a straight line in a stacking direction, the portion where the coil electrodes are formed on magnetic layers becomes thicker than other portions by the thickness of the coil electrodes and upwardly protrudes in the stacking direction. The portion protrudes more as the number of coil electrodes increases, which causes formation of projections and depressions on the surface of a multilayer body.

When such projections and depressions exist on the surface of a multilayer body, a multilayer coil component is implemented on a printed circuit board in a tilted manner, resulting in poor implementation of the multilayer coil component on the printed board. As a negative effect, a poor connection between the multilayer coil component and the printed circuit board may be created, and the multilayer coil component may come off from the printed circuit board due to lack of implementation strength between the multilayer coil component and the printed circuit board. Furthermore, when an electronic component is mounted on the surface of a multilayer coil component, a poor connection between the multilayer coil component and the electronic component may be created, and the electronic component may come off from the multilayer coil component.

SUMMARY OF THE INVENTION

To overcome the problems described above, preferred embodiments of the present invention described hereinafter provide a multilayer electronic component that can suppress the formation of projections and depressions on a surface and an electronic component module including the multilayer electronic component.

According to a first embodiment of the present invention, a multilayer electronic component includes a plurality of inner electrodes having a shape of ring-shaped wiring with a part removed therefrom, the inner electrodes being electrically connected to each other to constitute a coil, and insulating layers stacked together with the plurality of inner electrodes, wherein multiple kinds of the inner electrodes having different radii are periodically arranged in a stacking direction.

According to the first embodiment of the present invention, multiple kinds of inner electrodes having different radii are periodically arranged in a stacking direction. This makes it difficult for the inner electrodes to align in a straight line in the stacking direction. Therefore, in a multilayer body composed of insulating layers, the thickness difference caused by the inner electrodes between the portion where the inner electrodes are formed and other portions tends to be small. As a result, the formation of projections and depressions on a surface can be suppressed.

In the first embodiment of the present invention, the inner electrodes having a first radius and the inner electrodes having a second radius smaller than the first radius may be alternately arranged in the stacking direction.

In the first embodiment of the present invention, part of each of the inner electrodes having the first radius may overlap in the stacking direction with part of each of the inner electrodes having the second radius adjacent to the inner electrodes having the first radius in the stacking direction.

In the first embodiment of the invention, the inner electrodes having the first radius may overlap in the stacking direction with the inner electrodes having the second radius that are adjacent to the inner electrodes having the first radius in the stacking direction, throughout their circumferences except for the removed portions.

In the first embodiment of the invention, internal circumference portions of the inner electrodes having the first radius may be positioned inside of external circumference portions of the inner electrodes having the second radius.

In the first embodiment of the invention, centers of the plurality of inner electrodes may be aligned in a straight line.

In the first embodiment of the invention, the insulating layers may be composed of multiple kinds of insulating layers having different thicknesses.

In the first embodiment of the invention, the multilayer electronic component may further include capacitor electrodes electrically connected to the inner electrodes to constitute a capacitor.

In the first embodiment of the invention, the coil and the capacitor may constitute a resonant circuit or a filter circuit.

In the first embodiment of the invention, the insulating layers may be composed of a magnetic material.

In a second embodiment of the present invention, an electronic component module includes the multilayer electronic component according to the first embodiment of the present invention, and an electronic component mounted on a surface of a multilayer body composed of the insulating layers, the electronic component being electrically connected to the coil.

According to the present invention, since multiple kinds of inner electrodes having different radii are periodically arranged in a stacking direction, the formation of projections and depressions on the surface of a multilayer body can be suppressed.

DETAILED DESCRIPTION OF PREFERRED EMBODIMENTS

A multilayer electronic component according to an embodiment of the present invention will be described hereinafter.

Figure 1:
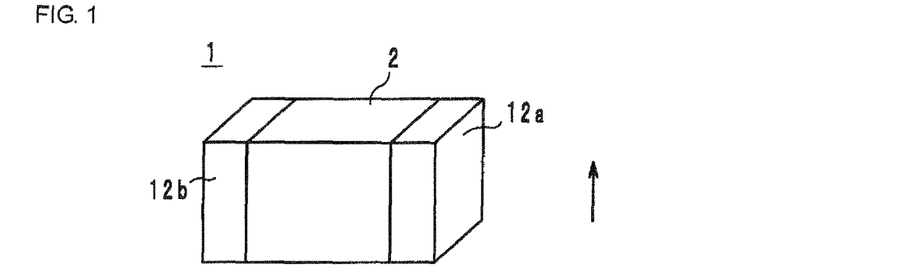
FIG. 1 is a perspective view of a multilayer electronic component according to a first embodiment.
Figure 2:
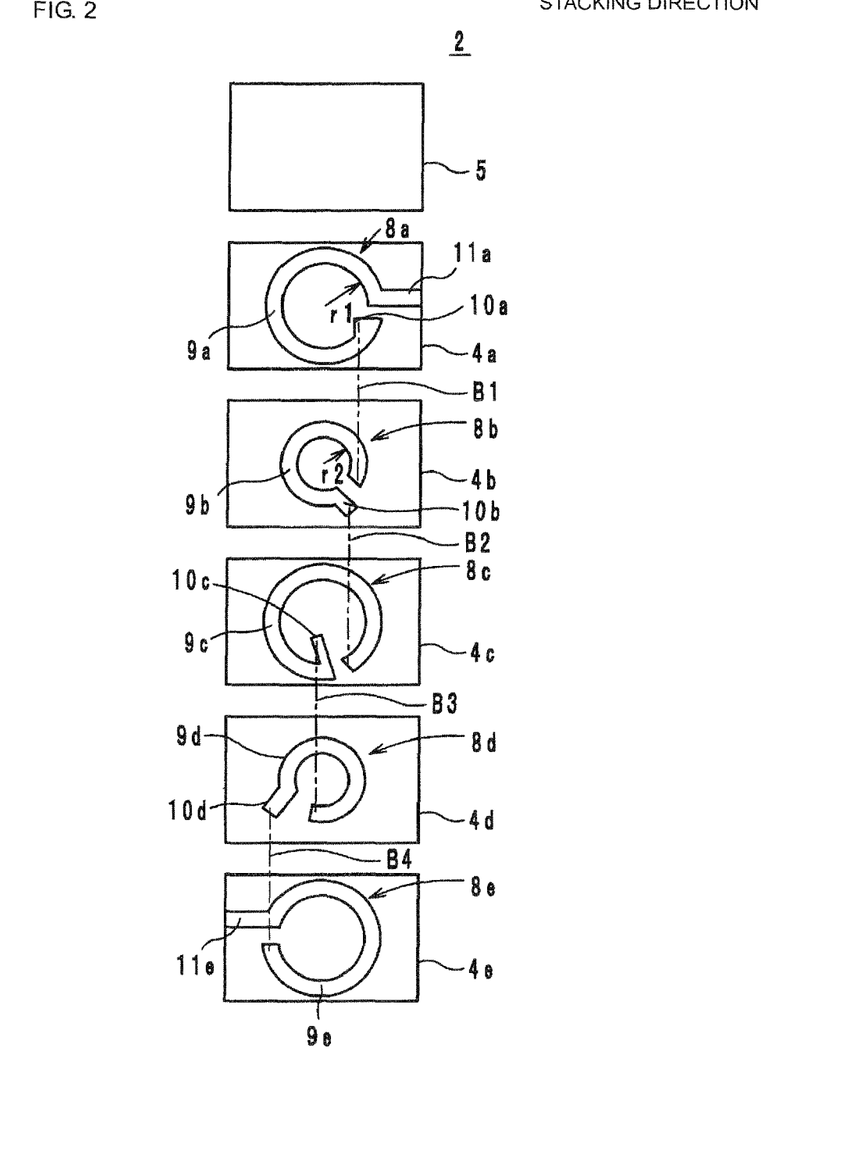
FIG. 2 is an exploded view of a multilayer body of the multilayer electronic component.
Figure 3:
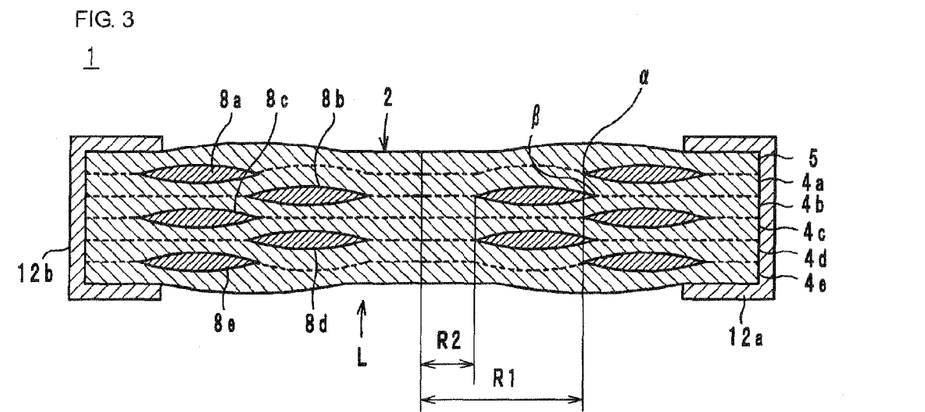
FIG. 3 is a sectional view of the multilayer electronic component.

FIG. 1 is a perspective view of a multilayer electronic component 1. FIG. 2 is an exploded view of a multilayer body 2. FIG. 3 is a sectional view of the multilayer electronic component 1. In FIG. 3, a section in a plane parallel to a stacking direction is shown. Hereinafter, a direction in which ceramic green sheets are stacked when the multilayer electronic component 1 is formed is defined as the stacking direction.

As shown in FIG. 1, a structure of the multilayer electronic component 1 includes the rectangular parallelepiped multilayer body 2 having a coil L therein and two outer electrodes 12a and 12b formed on the opposite side faces of the multilayer body 2 and connected to the coil L.

The multilayer body 2 has a structure in which a plurality of coil electrodes and a plurality of magnetic layers are stacked together, as specifically described below.

As shown in FIG. 2, the multilayer body 2 has a structure in which a plurality of magnetic layers 4a to 4e and 5 made of ferrite with high permeability (e.g., Ni—Zn—Cu ferrite or Ni—Zn ferrite) are stacked. The plurality of magnetic layers 4a to 4e and 5 are rectangular insulating layers having substantially the same area and shape.

Coil electrodes 8a to 8e electrically connected to each other to constitute the coil L are respectively formed on the principal surfaces of the magnetic layers 4a to 4e. Furthermore, via conductors B1 to B4 are respectively formed in the magnetic layers 4a to 4d. Hereinafter, an alphabetic character is added after a reference numeral to indicate individual magnetic layers 4a to 4e and coil electrodes 8a to 8e, whereas an alphabetic character after a reference numeral is omitted to collectively indicate the magnetic layers 4a to 4e and the coil electrodes 8a to 8e. In addition, a numeral is added after B to indicate individual via conductors B1 to B4 whereas a numeral after B is omitted to collectively indicate via conductors B1 to B4.

Each of the coil electrodes 8 composed of a conductive material such as Ag has a shape of ring-shaped wiring with a part removed therefrom. In this embodiment, the coil electrodes 8 are C-shaped. The coil electrodes 8 are connected to each other to constitute the coil L. The coil electrode 8a includes a wiring portion 9a and extending portions 10a and 11a. The coil electrodes 8b, 8c, and 8d include wiring portions 9b, 9c, and 9d and extending portions 10b, 10c, and 10d, respectively. The coil electrode 8e includes a wiring portion 9e and an extending portion 11e. Hereinafter, an alphabetic character is added after a reference numeral to indicate individual wiring portions 9a to 9e and extending portions 10a to 10d, 11a, and 11e, whereas an alphabetic character after a reference numeral is omitted to collectively indicate the wiring portions 9a to 9e and the extending portions 10a to 10d, 11a, and 11e.

The wiring portions 9 have a shape of ring-shaped wiring with a part removed therefrom. A current flows circularly through the wiring portions 9. The wiring portions 9 are constituted by multiple kinds of wiring portions having different radii. In this embodiment, the wiring portions 9 are constituted by the wiring portions 9a, 9c, and 9e having a radius r1 and the wiring portions 9b and 9d having a radius r2 that is smaller than the radius r1. The radii r1 and r2 are lengths between the center and the internal circumference of the wiring portions 9.

The wiring portion 9a has one end connected to the extending portion 11a and another end connected to the extending portion 10a. The extending portion 11a is wiring for electrically connecting the coil L to the outer electrode 12a and outwardly extends from the wiring portion 9a. The extending portion 10a inwardly extends from the wiring portion 9a. One end of the extending portion 10a is connected to the via conductor B1 that penetrates the magnetic layer 4a in the stacking direction.

The wiring portion 9b has one end connected to the via conductor B1 and another end connected to the extending portion 10b. The extending portion 10b outwardly extends from the wiring portion 9b. One end of the extending portion 10b is connected to the via conductor B2 that penetrates the magnetic layer 4b in the stacking direction.

The wiring portion 9c has one end connected to the via conductor B2 and another end connected to the extending portion 10c. The extending portion 10c inwardly extends from the wiring portion 9c. One end of the extending portion 10c is connected to the via conductor B3 that penetrates the magnetic layer 4c in the stacking direction.

The wiring portion 9d has one end connected to the via conductor B3 and another end connected to the extending portion 10d. The extending portion 10d outwardly extends from the wiring portion 9d. One end of the extending portion 10d is connected to the via conductor B4 that penetrates the magnetic layer 4d in the stacking direction.

The wiring portion 9e has one end connected to the via conductor B4 and another end connected to the extending portion 11e. The extending portion 11e is wiring for electrically connecting the coil L to the outer electrode 12b and outwardly extends from the wiring portion 9e.

The magnetic layers 5 and 4a to 4e of an exploded perspective view shown in FIG. 2 are stacked in shown sequence from the top in the stacking direction to form the multilayer body 2. The outer electrodes 12a and 12b are then formed on the surface of the multilayer body 2 to obtain the multilayer electronic component 1 having a sectional structure shown in FIG. 3. The sectional structure of the multilayer electronic component 1 will now be described with reference to FIGS. 2 and 3.

In the multilayer electronic component 1, as shown in FIGS. 2 and 3, multiple kinds of coil electrodes 8 having different radii are periodically arranged in the stacking direction. In this embodiment, the coil electrodes 8a, 8c, and 8e having the radius r1 and the coil electrodes 8b and 8d having the radius r2 are alternately arranged in the stacking direction. The centers of the coil electrodes 8 are aligned in a straight line.

Furthermore, part of each of the coil electrodes 8a, 8c, and 8e having the radius r1 overlaps in the stacking direction with part of each of the coil electrodes 8b and 8d having the radius r2 that are adjacent to the coil electrodes 8a, 8c, and 8e in the stacking direction. Specifically, as shown in FIG. 3, the internal circumference portions α of the coil electrodes 8a, 8c, and 8e are positioned inside of the external circumference portions β of the coil electrodes 8b and 8d (to the coil axis side of the coil L). In other words, the coil electrodes 8a, 8c, and 8e having the radius r1 overlap in the stacking direction with the coil electrodes 8b and 8d having the radius r2 that are adjacent to the coil electrodes 8a, 8c, and 8e in the stacking direction, throughout their circumferences except for the removed portions.

A method for manufacturing the multilayer electronic component 1 will now be described with reference to FIGS. 1 to 3. In the manufacturing method described below, a single multilayer electronic component 1 is manufactured by a sheet stacking method.

First, a ceramic green sheet to be the magnetic layers 4 and 5 is manufactured as follows. Ferric oxide ($Fe_2O_3$), zinc oxide (ZnO), nickel oxide (NiO), and copper oxide (CuO) weighed so as to be in a certain ratio are inserted into a ball mill as raw materials to conduct wet mixing. After the resultant mixture is dried and then crushed, the obtained powder is calcined at 800° C. for 1 hour. The calcined powder is wet-crushed using the ball mill, dried, and disintegrated to obtain a ferrite ceramic power having a particle size of 2 μm.

A binder (e.g., vinyl acetate, water-soluble acrylic, etc.), a plasticizer, a humectant, and a dispersant are added to the ferrite ceramic power to conduct mixing in a ball mill. Subsequently, the resultant mixture is defoamed by decompression. The obtained ceramic slurry is formed into a sheet by a doctor blade method and then dried to make a ceramic green sheet having a desired thickness (e.g., 40 μm).

The via conductors B are then formed in the ceramic green sheets to be the magnetic layers 4a to 4d. Specifically, through-holes are formed by applying a laser beam to the ceramic green sheets. The through-holes are filled with a conductive paste composed of Ag, Pd, Cu, Au, or an alloy thereof by, for example, a printing method.

Subsequently, a conductive paste mainly composed of Ag, Pd, Cu, Au, or an alloy thereof is applied to the ceramic green sheets to be the magnetic layers 4a to 4d by screen printing, photolithography, or other methods to form the coil electrodes 8. The coil electrodes 8 and the via conductors B may be simultaneously formed on the ceramic green sheets.

Next, the ceramic green sheets are stacked. Specifically, the ceramic green sheet to be the magnetic layer 4e is disposed. The ceramic green sheet, which is to be the magnetic layer 4d, is then disposed on the ceramic green sheet, which is to be the magnetic layer 4e, and is temporarily pressure-bonded thereto. Likewise, the ceramic green sheets, which are to be the magnetic layers 4c, 4b, 4a, and 5, are also stacked and temporarily pressure-bonded in that sequence. Consequently, a green multilayer body 2 is formed. Permanent pressure-bonding is conducted on the green multilayer body 2 by isostatic pressing or the like.

A debinding process and sintering are conducted on the multilayer body 2. The debinding process is conducted, for example, at 400° C. for 3 hours. The sintering is conducted, for example, at 900° C. for 2 hours. This provides a sintered multilayer body 2. The outer electrodes 12a and 12b are formed on the surface of the multilayer body 2 by applying an electrode paste mainly composed of Ag through an immersion method and then by baking the electrode paste. As shown in FIG. 1, the outer electrodes 12a and 12b are respectively formed on the right and left end faces of the multilayer body 2. The coil electrodes 8a and 8e are electrically connected to the outer electrodes 12a and 12b, respectively.

Finally, Ni plating/Sn plating is provided on the surfaces of the outer electrodes 12a and 12b. The multilayer electronic component 1 shown in FIG. 1 is completed through the steps described above.

With the multilayer electronic component 1, the formation of projections and depressions on the surface of the multilayer body 2 can be suppressed as described below. Specifically, since coil electrodes of conventional multilayer coil components are aligned in a straight line in the stacking direction, the portion where the coil electrodes are formed on magnetic layers becomes thicker than other portions by the thickness of the coil electrodes and upwardly protrudes in the stacking direction. The portion protrudes more as the number of coil electrodes increases, which causes formation of projections and depressions on the surface of a multilayer body.

In contrast, as shown in FIG. 3, a line in which the coil electrodes 8a, 8c, and 8e are aligned and another line in which the coil electrodes 8b and 8d are aligned are formed in the multilayer electronic component 1. Therefore, the protrusion on the multilayer body is dispersed along the line in which the coil electrodes 8a, 8c, and 8e are aligned and the other line in which the coil electrodes 8b and 8d are aligned.

For example, in the case where five coil electrodes are aligned in a straight line as with the conventional multilayer coil components, the portion where the coil electrodes are formed in the multilayer body becomes thicker than other portions by the thickness of the five coil electrodes. In the multilayer electronic component 1 of the present invention, on the other hand, the coil electrodes 8 are separated into two lines and aligned in two straight lines. Thus, the portion where the coil electrodes 8 are formed in the multilayer body 2 becomes thicker than other portions by only the thickness of two or three coil electrodes. As a result, with the multilayer electronic component 1, the formation of projections and depressions on the surface of the multilayer body 2 can be advantageously suppressed.

Furthermore, in the present invention, since the amount of the protrusion of the magnetic layers 4 and 5 can be reduced, the formation of a crack due to stress concentration on the magnetic layers 4 and 5 can be advantageously suppressed.

Since the centers of the coil electrodes 8 are aligned in a straight line in the multilayer electronic component 1, magnetic flux generated by the coil L can be concentrated on the centers of the coil electrodes 8. Consequently, the inductance of the coil L can be advantageously increased with the multilayer electronic component 1.

In the multilayer electronic component 1 of the present invention, the coil electrodes 8 adjacent to each other in the stacking direction partly overlap each other in the stacking direction. By disposing the coil electrodes 8 in such a manner, the coil electrodes 8 adjacent to each other in the stacking direction can be brought close to each other. As a result, the magnetic coupling between the coil electrodes 8 adjacent to each other in the stacking direction becomes strong and the multilayer electronic component 1 having high magnetic coupling is advantageously obtained.

Figure 4:
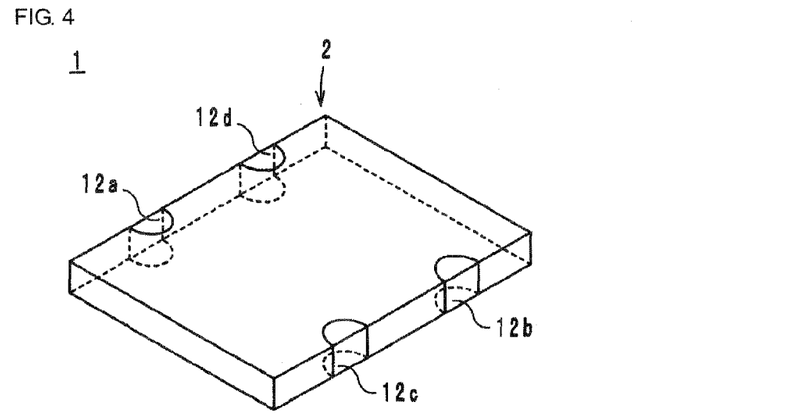
FIG. 4 is a perspective view of a multilayer electronic component according to a modification of the first embodiment.

In another embodiment of the present invention, the two outer electrodes 12a and 12b of the multilayer electronic component 1 are formed so as to cover the entire side faces of the multilayer body 2, but the way of forming the outer electrodes 12a and 12b is not limited to this. For example, as shown in FIG. 4, outer electrodes 12a, 12b, 12c, and 12d may be formed so as to cover part of the side faces and part of the top and bottom faces in the stacking direction of the multilayer body 2. In the case where the multilayer electronic component 1 includes two coils L as with a transformer, four outer electrodes 12 that respectively correspond to the input/output of the two coils L are disposed as shown in FIG. 4.

Figure 5:
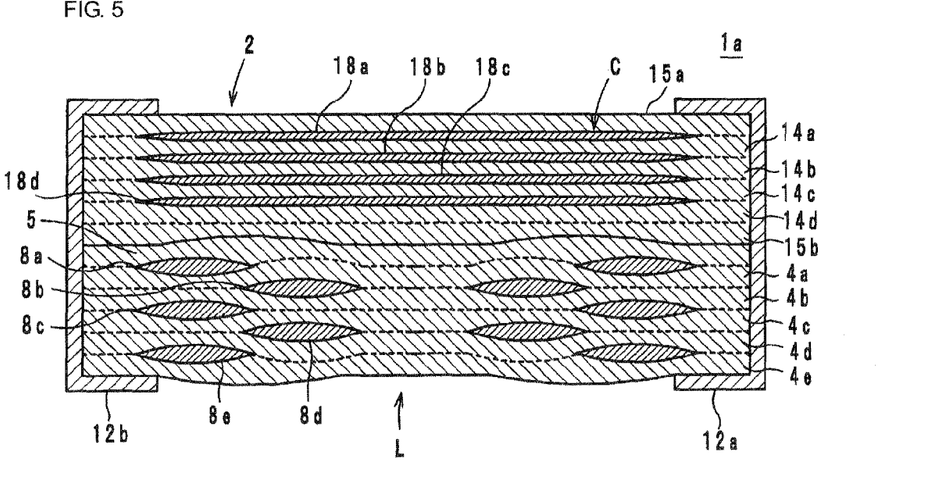
FIG. 5 is a sectional view of a multilayer electronic component according to another embodiment.

A multilayer electronic component according to the present invention is not limited to the multilayer electronic component 1 according to the embodiments described above. Therefore, the design of the multilayer electronic component 1 may be suitably changed. A multilayer electronic component according to another embodiment and an electronic component module including the multilayer electronic component will now be described with reference to the drawings. FIG. 5 is a sectional view of a multilayer electronic component 1a according to another embodiment. In the multilayer electronic component 1a of FIG. 5, the same structures as those in the multilayer electronic component 1 of FIG. 1 are designated by the same reference numerals.

In the multilayer electronic component 1a shown in FIG. 5, layers including a capacitor C are stacked above the layers including the coil L in the stacking direction. The multilayer electronic component 1a is an LC composite circuit element including a resonant circuit or a filter circuit constituted by the coil L and the capacitor C.

The multilayer electronic component 1a includes dielectric layers 14a to 14d, 15a, and 15b and capacitor electrodes 18a to 18d, in addition to the multilayer electronic component 1. The dielectric layers 14a to 14d, 15a, and 15b composed of a dielectric material have a rectangular shape as with the magnetic layers 4 and 5. The capacitor electrodes 18a to 18d are formed on the principal surfaces of the dielectric layers 14a to 14d, respectively. The capacitor electrodes 18a to 18d are sheet electrodes that constitute the capacitor C.

The dielectric layers 14a to 14d, 15a, and 15b are stacked on the magnetic layer 5 in the sequence shown in FIG. 5 from the top in the stacking direction. The outer electrodes 12a and 12b are then formed on the side faces of the multilayer body 2 to complete the multilayer electronic component 1a. The capacitor C and the coil L are electrically connected to each other through via conductors (not shown).

In the multilayer electronic component 1a, the formation of projections and depressions on the surface of the multilayer body 2 can be suppressed as with the multilayer electronic component 1.

Figure 6:
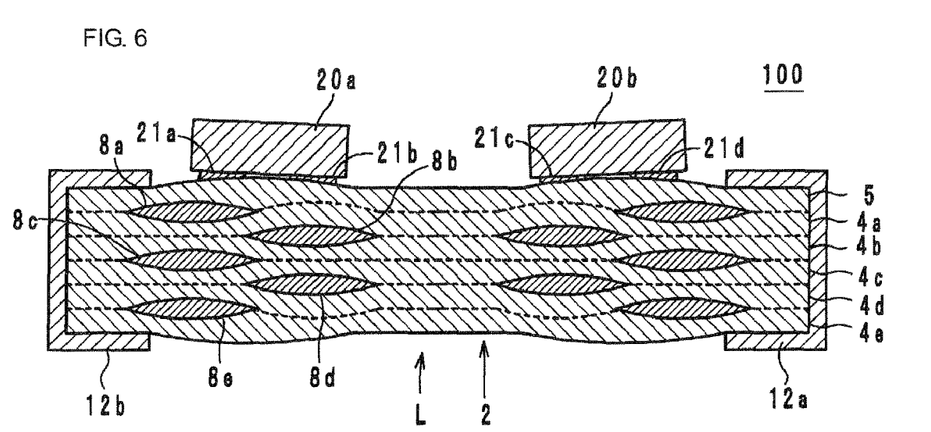
FIG. 6 is a sectional view of an electronic component module.
Figure 7:
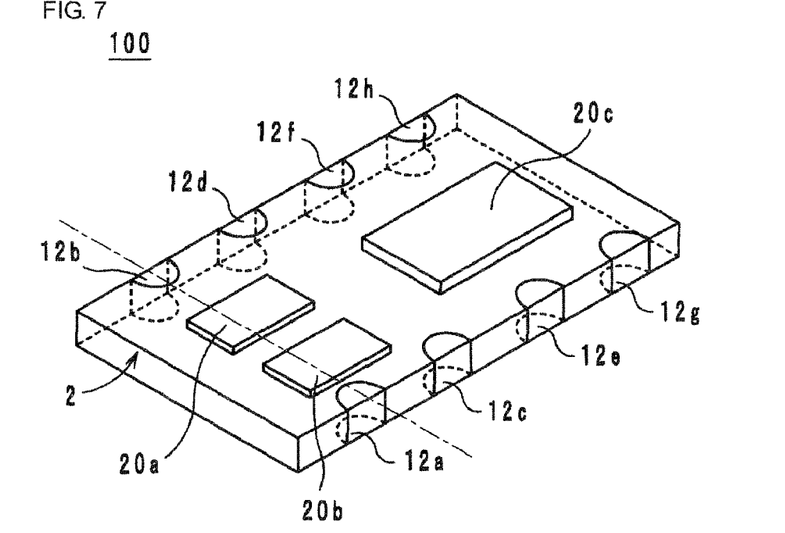
FIG. 7 is a perspective view of the electronic component module.

As shown in FIG. 6, which is a sectional view of an electronic component module 100, and in FIG. 7, which is a perspective view of the electronic component module 100, electronic components 20a to 20c may be disposed on the upper surface of the multilayer electronic component 1 in the stacking direction. FIG. 6 is a sectional view taken along a chain line of FIG. 7. In this case, a via conductor (not shown) is formed in the magnetic layer 5 of the multilayer electronic component 1, while at the same time an electrode pad (not shown) connected to the via conductor is formed on the upper surface of the multilayer body 2 in the stacking direction. The electronic components 20a and 20b are electrically connected to the electrode pad through solder connections 21a, 21b, 21c, and 21d, whereby they are implemented on the multilayer electronic component 1.

Figure 8:
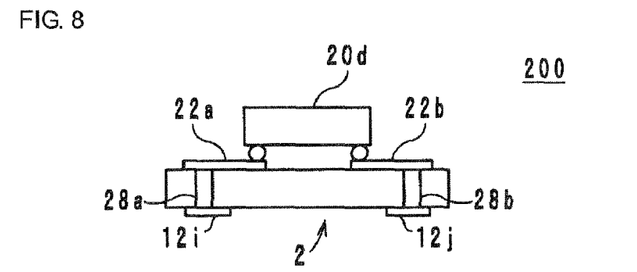
FIG. 8 is a sectional view of an electronic component module.

In another embodiment, an electronic component module 200 may have a sectional structure shown in FIG. 8. FIG. 8 is a sectional view of the electronic component module 200. Land grid array (LGA) electrodes 12i and 12j are formed on the lower surface of the multilayer electronic component 1. The LGA electrodes 12i and 12j are connected to electrodes 22a and 22b on which an electronic component 20d is mounted, through via conductors 28a and 28b. Such via conductors 28a and 28b for electrically connecting the LGA electrodes 12i and 12j to the electrodes 22a and 22b may be disposed. The via conductors 28a and 28b may electrically connect the LGA electrodes 12i and 12j or the electrodes 22a and 22b to inner electrodes 8.

The magnetic layers 4 and 5 do not necessarily have a uniform thickness, and may be constituted by multiple kinds of magnetic layers having different thicknesses. The magnetic coupling between the coil electrodes 8 adjacent to each other in the stacking direction can be adjusted by controlling the thickness of the magnetic layers 4 and 5.

Although the coil electrodes 8 having two sizes of the radii r1 and r2 are used in the multilayer electronic components 1 and 1a, the sizes of the radii of the coil electrodes 8 are not limited to this. Multiple kinds of coil electrodes 8 having different radii should be periodically arranged. For example, the coil electrodes 8 having three or more of sizes of radii may be used for the multilayer electronic components 1 and 1a.

In the multilayer electronic components 1 and 1a, the coil electrodes 8 having two sizes of the radii r1 and r2 are alternately arranged in the stacking direction, but the way of arranging the coil electrodes 8 is not limited to this configuration. Multiple kinds of coil electrodes 8 having different radii should be periodically arranged. For example, two of the coil electrodes 8 having the radius r2 may be arranged after two of the coil electrodes 8 having the radius r1 are arranged.

Figure 9:
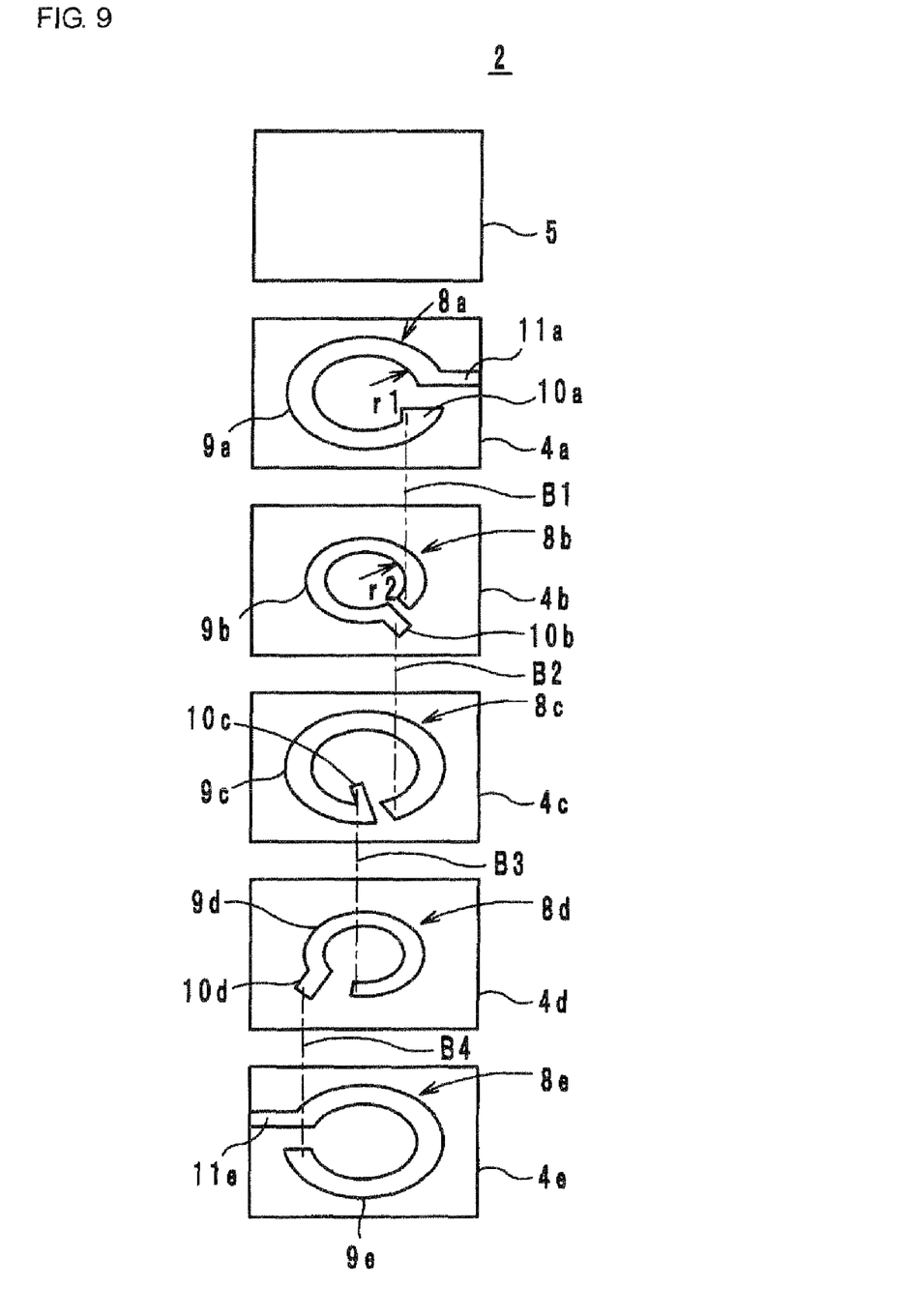
FIG. 9 is an exploded view of a multilayer body of a multilayer electronic component according to a modification of an embodiment of the present invention.
Figure 10:
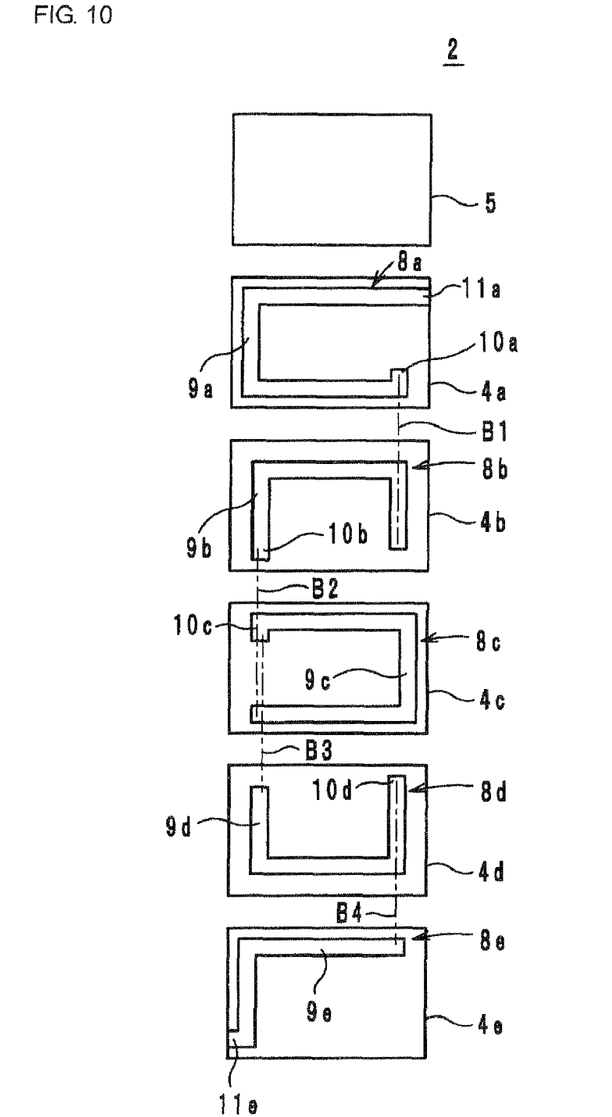
FIG. 10 is an exploded view of a multilayer body of a multilayer electronic component according to a modification of an embodiment of the present invention.

The shape of the coil electrodes 8 is not limited to a shape in which part of a circle is removed. The coil electrodes 8 may be of ring-shaped wiring with a part removed therefrom. Thus, the coil electrodes 8 may have a shape in which part of an ellipse is removed, for example, as shown in FIG. 9 with an exploded view of a multilayer body 2 of a multilayer electronic component 1b according to a modification of the present invention. The coil electrodes 8 may have a shape in which part of a rectangle is removed, as shown in FIG. 10 with an exploded view of a multilayer body 2 of a multilayer electronic component 1c according to a modification of the present invention.

Furthermore, the coil electrodes 8 may have a partial spiral shape such that the radius gradually decreases or increases. In this case, the radius of the coil electrodes 8 is an average length between the center of an ellipse or the center of a rectangle (intersection point of diagonal lines) and the internal circumference of the wiring portions 9.

As described above, the present invention is useful for a multilayer electronic component and an electronic component module including the multilayer electronic component. In particular, the present invention has an advantage of suppressing the formation of projections and depressions on a surface.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:
1. A multilayer electronic component comprising:
a plurality of inner electrodes, each having a conductive turn of a coil and formed on a respective insulating layer, the plurality of insulating layers and inner electrodes stacked in a stacking direction, and the inner electrodes electrically connected to each other to constitute a three-dimensional coil, wherein
multiple kinds of the inner electrodes having conductive turns of different radii are periodically arranged in the stacking direction, and no portion of the conductive turn of any one of the inner electrodes overlaps, in the stacking direction, with an axis passing through a center portion of the conductive material of the conductive turn of an adjacent one of the inner electrodes, said axis parallel with the stacking direction.

2. The multilayer electronic component according to claim 1, wherein the inner electrodes having a first radius and the inner electrodes having a second radius smaller than the first radius are alternately arranged in the stacking direction.

3. The multilayer electronic component according to claim 2, wherein part of each of the inner electrodes having the first radius overlaps in the stacking direction with part of each of the inner electrodes having the second radius that are adjacent to the inner electrodes having the first radius in the stacking direction.

4. The multilayer electronic component according to claim 3, wherein the inner electrodes having the first radius overlap in the stacking direction with the inner electrodes having the second radius that are adjacent to the inner electrodes having the first radius in the stacking direction, throughout their circumferences.

5. The multilayer electronic component according to claim 3, wherein internal circumference portions of the inner electrodes having the first radius are positioned inside of external circumference portions of the inner electrodes having the second radius.

6. The multilayer electronic component according to claim 1, wherein each of the plurality of inner electrodes has a center, and the centers of the plurality of inner electrodes are aligned in a straight line.

7. The multilayer electronic component according to claim 1, wherein the insulating layers are composed of multiple kinds of insulating layers having different thicknesses.

8. The multilayer electronic component according claim 1, further comprising:
capacitor electrodes electrically connected to the inner electrodes to constitute a capacitor.

9. The multilayer electronic component according to claim 8, wherein the coil and the capacitor constitute one of a resonant circuit and a filter circuit.

10. The multilayer electronic component according to claim 1, wherein the insulating layers are composed of a magnetic material.

11. An electronic component module comprising:
a multilayer electronic component including
a plurality of inner electrodes, each inner electrode having a conductive turn of a coil and formed on a respective insulating layer, the plurality of insulating layers and inner electrodes stacked in a stacking direction, and the inner electrodes electrically connected to each other to constitute a three-dimensional coil, wherein
multiple kinds of the inner electrodes having conductive turns of different radii are periodically arranged in the stacking direction, and
no portion of the conductive turn of any one of the inner electrodes overlaps, in the stacking direction, with an axis passing through a center portion of the conductive material of the conductive turn of an adjacent one of the inner electrodes, said axis parallel with the stacking direction; and
an electronic component mounted on a surface of the multilayer component composed of the insulating layers, the electronic component being electrically connected to the coil of the multilayer component.

12. The multilayer electronic component according to claim 11, wherein the inner electrodes having a first radius and the inner electrodes having a second radius smaller than the first radius are alternately arranged in the stacking direction.

13. The multilayer electronic component according to claim 12, wherein part of each of the inner electrodes having the first radius overlaps in the stacking direction with part of each of the inner electrodes having the second radius that are adjacent to the inner electrodes having the first radius in the stacking direction.

14. The multilayer electronic component according to claim 13, wherein the inner electrodes having the first radius overlap in the stacking direction with the inner electrodes having the second radius that are adjacent to the inner electrodes having the first radius in the stacking direction, throughout their circumferences.

15. The multilayer electronic component according to claim 13, wherein internal circumference portions of the inner electrodes having the first radius are positioned inside of external circumference portions of the inner electrodes having the second radius.

16. The multilayer electronic component according to claim 11, wherein each of the plurality of inner electrodes has a center, and the centers of the plurality of inner electrodes are aligned in a straight line.

17. The multilayer electronic component according to claim 11, wherein the insulating layers are composed of multiple kinds of insulating layers having different thicknesses.

18. The multilayer electronic component according to claim 1, further comprising:
capacitor electrodes electrically connected to the inner electrodes to constitute a capacitor.

19. The multilayer electronic component according to claim 18, wherein the coil and the capacitor constitute one of a resonant circuit and a filter circuit.

20. The multilayer electronic component according to claim 11, wherein the insulating layers are composed of a magnetic material.

* * * * *